United States Patent
Webb et al.

(10) Patent No.: US 9,066,088 B1
(45) Date of Patent: Jun. 23, 2015

(54) COLOR MEASUREMENT AND CORRECTION OF MULTIPLE DISPLAY DEVICES

(75) Inventors: Stephen B. Webb, Denver, CO (US);
Michael Tolliver, Denver, CO (US);
Christopher O. Jaynes, Denver, CO (US)

(73) Assignee: Mersive Technologies, Inc., Denver, CO (US)

( * ) Notice: Subject to any disclaimer, the term of this patent is extended or adjusted under 35 U.S.C. 154(b) by 305 days.

(21) Appl. No.: 13/552,463

(22) Filed: Jul. 18, 2012

Related U.S. Application Data

(60) Provisional application No. 61/509,076, filed on Jul. 18, 2011.

(51) Int. Cl.
| | | |
|---|---|---|
| H04N 17/00 | (2006.01) | |
| H04N 17/02 | (2006.01) | |
| H04N 17/04 | (2006.01) | |
| H04N 9/73 | (2006.01) | |
| H01J 9/42 | (2006.01) | |

(52) U.S. Cl.
CPC .......... *H04N 17/04* (2013.01); *H04N 9/73* (2013.01); *H01J 9/42* (2013.01)

(58) Field of Classification Search
CPC ....... H04N 17/04; H04N 9/73; H04N 9/3182; H01J 9/42
USPC .......................... 348/191, 658; 345/207, 690
See application file for complete search history.

(56) References Cited

U.S. PATENT DOCUMENTS

| | | | |
|---|---|---|---|
| 2002/0122044 A1* | 9/2002 | Deering | 345/597 |
| 2008/0143978 A1* | 6/2008 | Damera-Venkata et al. | 353/94 |
| 2008/0246781 A1* | 10/2008 | Surati et al. | 345/690 |

* cited by examiner

*Primary Examiner* — Michael Lee
(74) *Attorney, Agent, or Firm* — Lathrop & Gage LLP

(57) ABSTRACT

A system and method for measuring and then correcting the color response from multiple projectors or display devices so that the devices can generate a color response that is uniform. An area light sensor (such as a commodity camera) is used to measure the color responses of each display and then to derive a model of the color transfer function for each display using a pattern of predetermined areas or regions displayed on each display device.

17 Claims, 4 Drawing Sheets

First display mask measured in the camera frame

Other display mask measured in the camera frame

Resulting measurement mask for first display

COLOR MEASUREMENT AND CORRECTION OF MULTIPLE DISPLAY DEVICES

RELATED APPLICATIONS

This Application claims the benefit of priority of Provisional Application Ser. No. 61/509,076 filed Jul. 18, 2011, incorporated herein by reference in its entirety.

BACKGROUND

Display systems composed of multiple display devices are often used to create a display that surpasses the resolution, size, and image quality capable of being created by a single display. By blending the output from multiple, overlapping projectors, for example, an image that surpasses the individual capability of any of the constituent projectors can be achieved. Other examples include an array of flat panel displays that act as a single display device or several video cubes that are stacked into a single display wall and then operated as a single display device. Because each display exhibits its own color and intensity response, it is important that the color response profiles of these devices are modified in such a way that, when they are driven as single display device, their color response profiles are similar.

SUMMARY

A system and method is described for measuring and then correcting the color response from multiple projectors or display devices so that the devices can generate a color response that is uniform. The present system utilizes a low-cost area light sensor (such as a commodity camera) to measure the color responses of each display and then to derive a model of the color transfer function for each display using a pattern of predetermined display areas or regions on each display device. The measurement aspect of the system employs one or more cameras or a single camera that is controlled to point at different displays during the measurement process.

DETAILED DESCRIPTION

Figure 1:
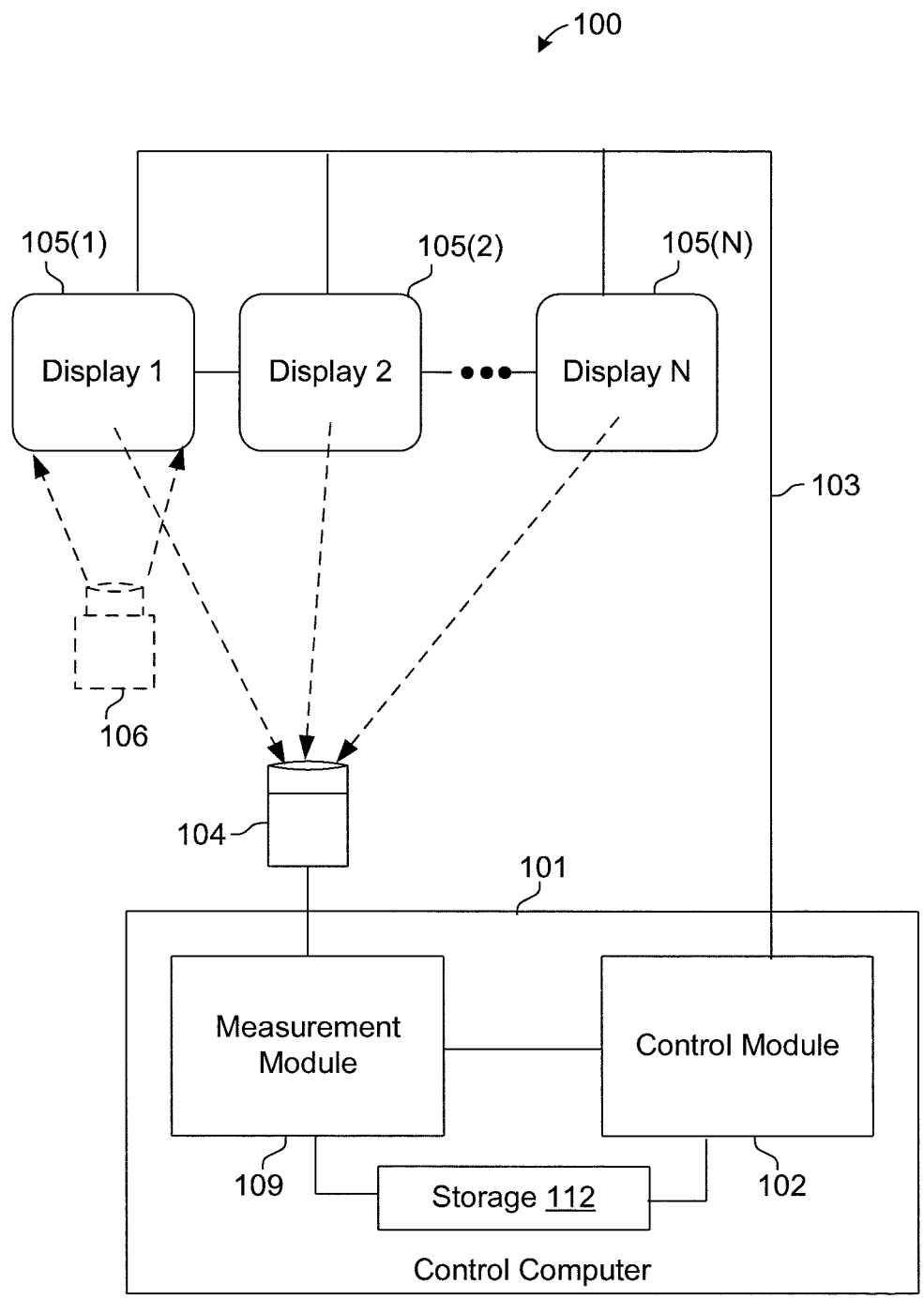
FIG. 1 is an exemplary overview of the present measurement system.

FIG. 1 is an exemplary overview of the present measurement system. One or more display devices 105(*) are observable from a measurement device 104, such as a digital camera. As used herein, the term "display device" or "display" includes any type of video projector or video monitor. Control computer 101 controls both the displays and the camera to acquire a set of measurements, as described in detail below.

Figure 1A:
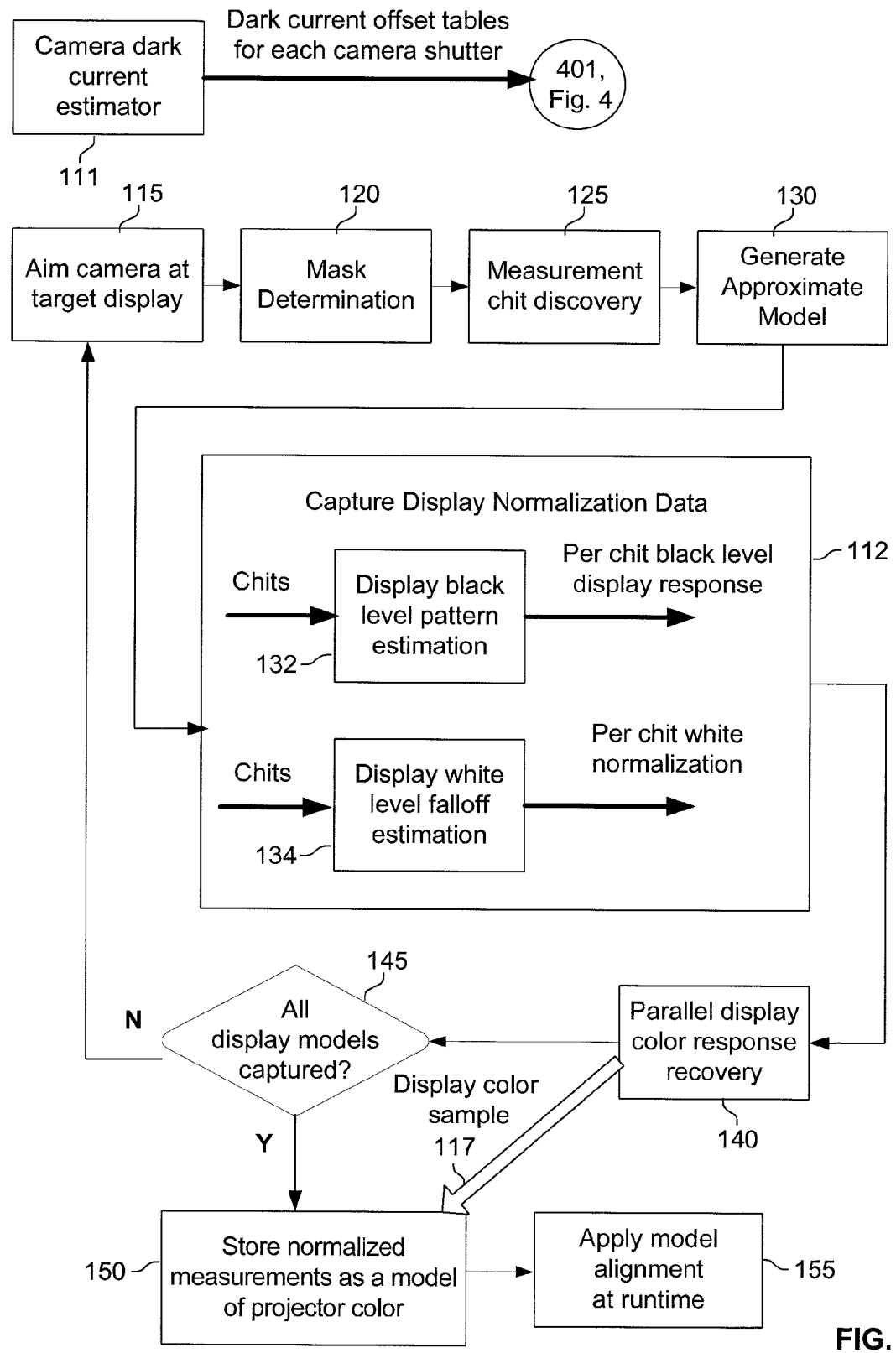
FIG. 1A illustrates an exemplary workflow of the color model capture process.

FIG. 1A illustrates an exemplary workflow of the color model capture process. The process is repeated for all devices in a display system to generate a set of models that describe their color response. In order to use a camera, several important normalization factors must be pre-computed (by 'capture display normalization data module' 112), and then used by an intelligent measurement module as part of the display color response recovery process.

Camera Dark Current Measurement

Because many cameras exhibit a dark current (or measurement values greater than zero when no energy is incident on the sensor), this could lead to artificially high measurements of R,G,B values when characterizing the color response of a display device. In order to avoid this, a preprocessing step (step 111) is necessary, in which the camera lens is covered and a set of dark current values are measured for a variety of different shutter speeds. These values $D_c(s)=r_0, g_o, b_0$, where s is the shutter speed of the camera and $r_0, g_0, b_0$ are stored and later used to remove the dark current at measurement time.

Camera dark current is corrected by modifying an observed color value that was taken at shutter speed s, $C_s=[r_c\ g_c\ b_c]$ by subtracting the known dark current values for each of the color channels at shutter s, yielding a measured color M at shutter speed s:

$$M_s = C_s - D_s = [r_c - r_o, g_c - g_o, b_c - b_0].$$

Mask Determination

In the case where the camera cannot observe the entire set of displays, it may be controlled to aim at each display in sequence. Once the camera has been oriented at a display (step 115), a measurement mask 210(1), representing the display surface as seen by the camera (in frame 205), is acquired. One measurement mask must be captured for each display to be measured and is a Boolean mask that represents what pixels in the camera view correspond to measurable regions in the display. At step 120, a mask for the first display device is acquired by instructing the primary display 105(1) to be measured to illuminate its screen with its maximum color and a image is captured. In order to ensure that a valid mask is detected, an appropriate shutter value may be automatically discovered (see shutter selection module). Next, other displays in the system are instructed to do the same and an image of each of the other displays is stored in system storage 122.

Figure 2:
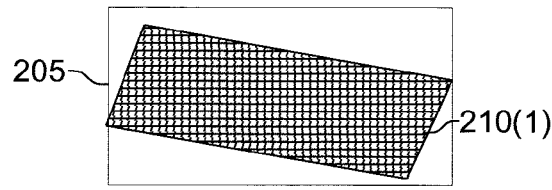
FIG. 2 illustrates an exemplary measurement mask.
Figure 2:
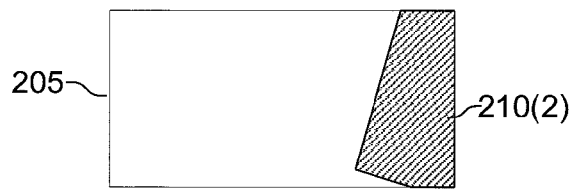
Figure 2:
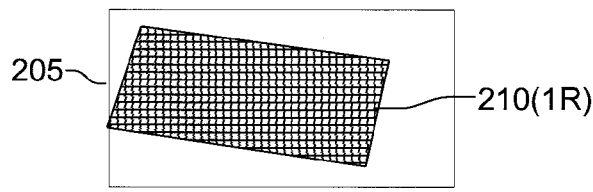
Figure 2:
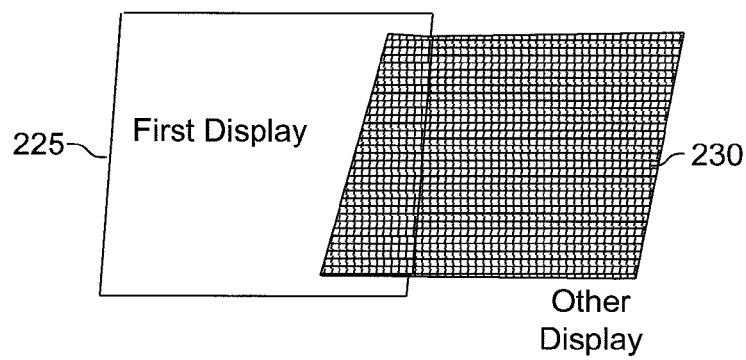
Figure 2:
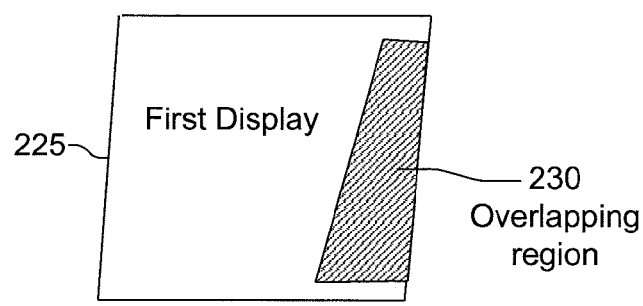

Because a multi-projector display may involve image overlap the masks observed for the non-primary display are subtracted from the primary mask to determine what regions in the camera correspond to the pixels in the primary projector that do not overlap other displays and, therefore, can be used to measure a color response of the projector. FIG. 2 depicts a two-projector overlapping display, the masks that are generated by the process [210(1)/210(2)], and the resulting measurement mask 210(1R) for the first display device captured in a frame of camera 104.

FIG. 2 illustrates an exemplary measurement mask 220 generated to denote what appropriate pixels in the camera should be used to measure the primary display so that overlapping regions are avoided and measuring outside of the display region does not occur.

Image processing steps may be applied to the resulting mask in order to remove noise (i.e., median filtering), ensure that the mask contains no holes (morphological "close" operations), and to detect an enclosing contour that represents the region in which valid measurements should take place.

Measurement Chit Determination

Figure 3:
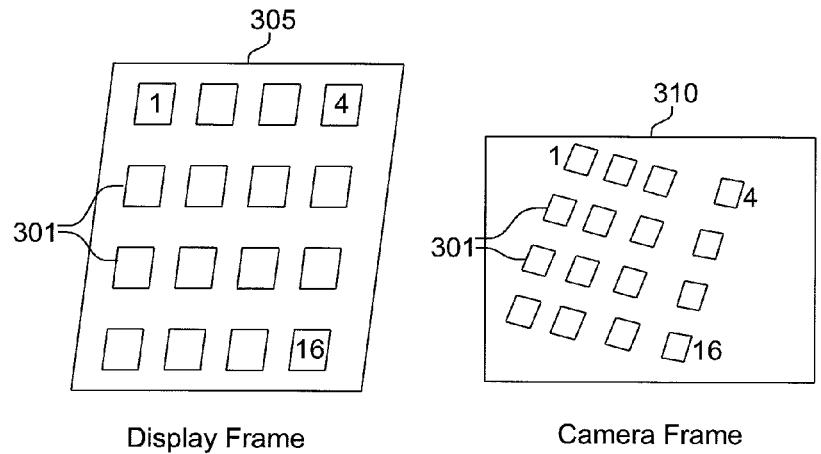
FIG. 3 is an exemplary illustration of the display pixel regions termed 'chits'.

At step 125, measurement "chits" (areas or regions of display pixels which together form a tiling pattern) in the display device are computed. This involves generating a measurement pattern of, for example, rectangular, display regions that will be used to measure the display device response. The correspondence between a chit (where different colors will be shown in the display) and its corresponding sample in the camera (when the color will be measured) must be recovered if the camera is to accurately measure different colors in the same image. FIG. 3 shows an example case where the display is to be divided into 16 different measurement chits. These correspond to 16 areas in the camera frame. It is important to note that the system does not make assumptions about the relative orientation, position or resolution of the camera and display being measured. Therefore the correspondence between chits and their position in the camera must be discovered.

FIG. 3 is an exemplary illustration of the display pixel regions or "chits" 301 drawn by the display device (indicated in display frame 305) and measured in the camera (indicated in camera frame 310). Because the camera can be placed in any position and orientation, the image of the chits in the camera frame is transformed via a perspective distortion. It is important to establish a correspondence between chits so that when a particular chit is illuminated by a particular color, the appropriate pixels in the camera are processed for measurement.

Correspondences may be recovered by displaying a chit a known number of times, based on an assigned identification number. By counting the number of times a chit is observed in the camera, the same identifier can be assigned to the sample in the camera frame. Once correspondence is established the system can display a chit of a particular color value, capture a camera image, and process the pixels in the camera to discover a measured value that is known to correspond to the displayed color.

Once Chits are established in correspondence with the camera, they are filtered by intersecting them with the measurement mask 220 for that display device. These chit regions may be further filtered to ensure that the pixels within a camera region correspond to the pixels in a display device that will later produce the colors to be measured. For example, an enclosing contour of each chit is detected and stored. This enclosing contour represents a rough approximation of the camera pixels that will contributed to chit measurements of that sample. Next the pixels within that contour may be thresholded to discard pixels that are too dark to produce valid measurements. Final operations on the enclosed pixels may include morphological operators such as erosion and dilation to ensure that the remaining pixels correspond to a region that is continuous, within a particular brightness threshold, and completely contained within the contour.

The result is a set of measurement chits in the display device that when illuminated with a particular color can be measured in the camera by extracting the camera pixels corresponding to the appropriate tile identifier. This measurement sample, S, is a pair of input (R,B,G) color values and a corresponding measurement in the camera S(R,G,B, r, g, b). These measurement samples are required to characterize the expected color response of a display device/display.

Shutter Selection Module 505

One aspect of the present color model capture process is the ability to use a low-cost commodity camera. In order to do so, the shutter of the camera must be set in such a way as to measure the color output of the display device, even if the display device's dynamic range far exceeds that of the camera at any particular shutter speed. For example, a typical CCD-based camera is set to a shutter speed of $1/60^{th}$ of a second, may be capable of measuring the brightest white of a projector illuminating a wall. However, that same shutter speed will not allow enough energy to reach the sensor when that same projector is emitting a "dark grey" color. Therefore, the shutter speed must be adjusted dynamically throughout the measurement process in order to ensure that an appropriate amount of energy is illuminating the shutter in all color bands for any particular measurement.

Although one cannot know what shutter speed should be selected for given display color (because the color response of the projector is yet unknown), it is possible to dynamically discover a shutter that yields a good camera measurement. This process is performed by the shutter selection module 505.

For a given (R,B,G) projector color chit, a corresponding camera value for all three color channels must be measured. Because a different shutter speed may be appropriate for each color channel, we measure the red, green, and blue camera values independently. For color channel, c, and the input (R,G,B) color value, a corresponding shutter s must be selected that yields a measurement value within a tolerable range $M_{min}$, $M_{max}$. The shutter can be iteratively adjusted until the camera observes the appropriate response value that is greater than $M_{min}$ and less than $M_{max}$ for color channel c in the camera. The exact algorithm for determining an appropriate shutter can vary from brute force wherein all possible shutter speeds are iteratively set and the corresponding camera response is measured to more sophisticated optimizations schemes including binary search and gradient descent.

Ultimately the shutter selection module yields a correct shutter value for a given (R,G,B) displayed value and a color channel in the camera to be measured for that displayed color.

The shutter selection module 505 allows every measurement sample to be derived after an appropriate shutter value is selected. In this way, the dynamic range of a traditional camera can be increased in a way that allows it to make accurate measurements of a display regardless of the brightness range of the display or the particular color being displayed. It is important to note that this module can be made more efficient if an initial shutter estimate is provided to an iterative search algorithm.

Shutter Normalization Module 510

Every sample that is measured is first normalized by the shutter speed that was used to measure it in order to convert a measured color value to a unit less sample space. In this way color samples measured in the camera can be compared directly regardless of the (potentially) different shutter speeds that were used to capture those samples. For example, a shutter speed of $1/60^{th}$ of a second may be used to measure the red channel of a 255,255,255 displayed color, yielding a camera red response of 123. This value is converted to a unit less space by normalizing by the shutter of 0.01666 resulting a sample value of 7,380. This number can now be directly compared with other samples regardless of shutter. Therefore, when a sample is generated by the measurement system it is stored in unit less values that correspond to the measured intensities in the camera corresponding the appropriate chit region for a given R,G,B value. M=(R,B,G, r, g, b).

Ultimately the shutter normalization module acts as a function that maps measured camera values (offset by the appropriate dark current at that shutter) to a normalized, unitless value that can be directly compared with other measurements;

$$M = M_s * N_s$$

Where $N_s$ is the shutter speed in seconds that was used to observe $M_s$. When combined with the dark offset values, the conversion of a measurement in the camera to the normalized space becomes:

$$M = (C_s - D_s) * N_s$$

It should be noted that a "measurement" from the camera, $C_s$, is not necessarily the value of a single pixel. Instead, it is typically a derived statistic over a neighborhood of pixel values. For example, in the case where a measurement is being produced from a particular chit, the pixel values contained within the chit boundary and whose chit mask values are 1, are converted to a single measurement by computing the mean value of pixels within the region. Furthermore, it may be the case that several repeated measurements of the same chit neighborhood are used to compute a statistic. In some cases, it may be valuable to discard the n largest values and k smallest pixel values prior to computing the final measurement statistic, $M_s$.

Approximate Color Space Capture

An approximate model of the color response space is measured, at step 130, by displaying solid colors in the projector and measuring those colors within the measurement mask of the projector under consideration. Solid colors at the corners of the input display color space (0,0,0), (0,255,0), (255,0,0), (255,255,0), (0, 255,255), and (255,255,255) are shown. A shutter is selected for each color and a sample is stored. Next a gamma function is fit to the measured samples at those endpoints to yield a straightforward model. This approximate model can then be inverted to yield an approximate shutter value for any given input color value. Of course, any model can be fit at this stage and independent gamma functions for each of the primary color values is an example of the type of predictive (but easy to measure) function that can be used.

This approximate model is used in conjunction with the shutter selection module to efficiently predict shutter speeds from a proposed display color triplet s=f(R,G,B) throughout the remaining measurement process.

Projector Black Level Pattern Estimation

When a display is instructed to project zero energy, oftentimes some energy will illuminate the display surface. Moreover, the energy that escapes the display device may exhibit non-uniformity in both intensity and color. At step 132, this black-level pattern is captured by instructing the primary projector to project zero energy. The R,G,B camera values for each chit are then measured and stored as a black offset that will be taken into account in the next stage.

These black level offsets are stored on a chit-by-chit basis and written as $B_{ID}$ where ID is the unique identifier for the chit that corresponds to the region that produced the black level measurement.

Projector Intensity Falloff Estimation

Projectors exhibit significant spatial variance in emittance energy. In order to take this into account during the final measurement phase, a chit pattern of full white is displayed and captured and a measurement sample for each chit is produced, at step 134. The relative energy at any given chit with respect to some global statistic is then computed and stored for each chit. For example, the sample value for a particular chit versus the mean energy of all chits is a good estimate of energy difference between the chit and the mean energy output of the display. This intensity falloff factor is stored per chit and can then be used to adjust the observed energy of a chit simply by multiplying the falloff factor for a given chit by the measured sample. This transforms that sample to a "mean" response sample as though it would have been measured across the entire display and then averaged. In this way, chit samples can be taken at many different spatial locations without introducing measurement bias based on energy differences across the display device being measured.

These values are computed on a chit-by-chit basis, and are computed intermittently throughout the measurement process. The intensity falloff values are stored and written as $F_{ID}(t)$, where ID is a unique identifier for the particular chit that produced that falloff measurement at time t.

Efficient Parallel Color Measurement of a Display

At this stage of processing, the measurement system has acquired a mapping between projector chits and their positions in the camera frame. In addition, an approximate model has been generated that allows the system to predict a camera shutter speed for a given projected value that will allow the measurement of a particular color channel effectively. Furthermore, a black level offset map (step 432) and a spatial normalization factor (step 434) are known.

The goal of present step 140 is to generate a display color response model by acquiring a large number of measurement samples 117 efficiently. These measurement samples are then used to build a representative model of the projector that, ultimately, can be used to predict the expected color response in a camera observing that display for any input color.

Consider k different color samples that must be measured. Because R,G,B color values need to be observed for each of those samples, 3*k image samples need to be captured. If we were to capture a model that requires 15 samples for each R,G,B color the total number of observations required is $15^3*3=10,125$. If it is assumed that the average measured color value is taken from a sequence of 5 images in order to avoid camera noise, the total number of images required is 50,625. If it is further assumed that the average shutter speed to be used in capturing those images is one second, it would take approximately 14 hours to capture the color model.

Because the projector has been spatially partitioned into a number of chits and normalization factors have been estimated that will allow the measurement of any input R,G,B color at any chit and then correct that measurement with the normalization factors (black level pattern, bright falloff, camera dark current, shutter speed). The system is now able to parallelize what would normally be a long and cumbersome measurement process.

First, the shutter estimation module 505 is used to estimate an appropriate shutter speed for each of the measurements to be observed. These values are then sorted into a priority queue by expected brightness in the camera using the low-resolution projector model that predicts, for any color, its expected color in the camera. For example the 50,625 different R,G,B values are sorted by expected camera brightness. It is important to note that the same R,G,B value appears in this sorted list at least three times because a measurement also involves the camera color channel that will be observed for that color.

Once sorted the first k measurement values are then presented by the display by placing those values into the chits pattern. Determining the placement of which R,G,B value to be rendered into what chit can be random or can be based on some algorithm that takes into account the expected falloff. The camera shutter is then set based on the expected shutter values in the colors that were loaded into the chit pattern for display. For example, the median shutter value of the k chits can be used. The camera then measures each of the chit color values. If a measurement cannot be observed within tolerable levels (i.e. it is too dark or too light) it is placed back on the priority queue for re-measurement. In addition, the expected shutter value for that chit is adjusted based on information that the chit was too bright (i.e. the shutter estimate yielded a shutter that was open too long) or too dark (i.e. the shutter estimate yielded a shutter that was too short). This updated measurement is placed back into the list in a sorted position.

The camera shutter can be adjusted based on updated measurements as well. This provided a measurement feedback loop to the system so that the shutter is not only set based on the expected shutter of the chits being displayed but the statistical history of the actual measurements themselves. At each stage, then, a new shutter is determined in a way that will maximize the number of measurements possible given historical performance of the measurements (i.e. the number of samples that could be measured versus the number on display) as well as the updated estimates of each of the chits being displayed. This process is repeated (per step 145) until all measurements have been captured, storing normalized measurements at step 150 to create a model of projector color.

This projector color model, which is applied at runtime to align the measured projectors (step 155), is an accurate representation of how the display is expected to perform when colors are provided to it. In particular, the model predicts for a given input color a normalized expected value that will be observed in the camera for any shutter speed. This information can then be used across all displays in a multi-display system to modify the displays in a way that ensures for a given input color all displays will produce a value that appears similar in the observing measurement device (camera). This process is summarized in FIG. 4, with the measurement module 109 having the capability of making accurate measurements regardless of chit location, falloff, and camera dark current.

Figure 4:
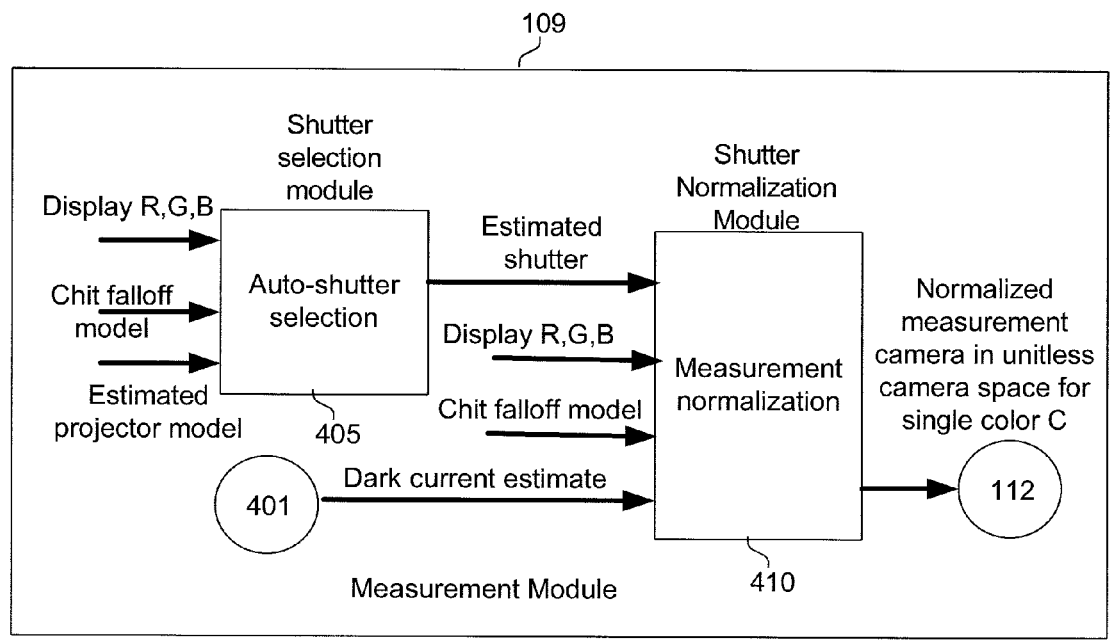
FIG. 4 is an illustration of an exemplary measurement module.

FIG. 4 is an illustration of an exemplary measurement module 109. An accurate measurement requires a significant amount of information beyond that provided by simply taking a camera image of the displayed color. Because the shutter is changing throughout the measurement process, it is first automatically determined, using the shutter selection module 405. For example, given a set of color values to be measured on the k displayable chits, one can select a shutter based on the mean intensity of those values, the brightest, or the darkest value. The mean value of the colors to be displayed produces a good initial estimate of the shutter speed for that stage of measurement.

The shutter speed selected for the current image capture, plus black pattern, white fall-off, the projector RGB to be displayed, and the camera's dark current estimate for that shutter, are all used to convert a camera measurement into a unitless camera space value that is independent of the input factors. The color value displayed by a particular chit, and then ultimately measured in the camera is stored as a pair. The measured camera value is converted to a normalized value by using both the camera dark offset and projector black falloff values, resulting in a measurement pair, we refer to as T (the color transfer function of a projected value and the camera measured color):

$$T_v(C_{rbg}, M)$$

where $C_{rgb}$ is an input color triple and x is a measurement color for a particular color channel (v=r, g, b). The process yield 3 sets of pairs, one for each color channel that model the input color value mapping to the expected color response in the camera for a particular color.

These measurements are finally normalized temporally using the intensity falloff measurements captured by the "projectors intensity falloff" function that was being captured periodically throughout the high-resolution measurement process. Each of the M values is modified based on the time they where captured and the white level offset values stored at that chit for the two times that enclose the measurement time. For example, if measurement M was captured at time t using chit a, two white offset measurements captured for chit a, one before time t, $t_0$, and one after time, $t_1$, are linearly interpolated based on their distances in time:

If, $F_a(t_0) = I_1$ and $F_a(t_1) = I_2$ then, $$F_a(t) = I_1 + \frac{((t - t_0)I_1) - ((t - t_0)I_0)}{t_1 - t_0}$$

which represents an effective intensity falloff for that chit, interpolated in time based on the two falloff measurements that were taken before and after the time that particular color measurement was made at that chit.

This effective falloff value is multiplied by the normalized color value to yield a unitless camera value for that measurement:

$$M_N = M * F_a(t)$$

The resulting measurement pair represents an input color triple and output expected measurement value, $T_v(C_{rbg}, M_N)$. This pair is stored as part of the color response model for that projector. Once all pairs have been generated, the model capture process is complete.

Component Procedures
Normalized High-Dynamic Range Capture

In one embodiment, the present system performs automatic shutter selection by search, that is, it automatically finds the best shutter given a displayed value that is likely to lead to a good measurement. Store values normalized by shutter. This makes use of a commodity camera viable in the marketplace.

Sample Accuracy Improvement Through Spatial Normalization

In one embodiment, offset chits in the image are measured, and the response of those chits at varying levels of intensity is modeled. The max/mean/min (or whatever statistic one may want to derive from the image) is normalized against. Using space/multiplexing to speed up the process allows the capture of more accurate models.

Sample Accuracy Improvement Through Temporal Normalization

In one embodiment, the display response is measured at known values over time. For example, for every 5 images a white image is projected. The time is stored at which each white normalization and every other image is captured. A measurement at time t is converted based on the changes observed in the normalization images. This allows the camera to measure the same value for the same input color at different times regardless of small temporal changes in the projector.

Dynamic Measurement Pattern Generation to Minimize the Number of Frames Captured In one embodiment, sorting a set of measurements based on their expected appearance in the camera for a particular shutter and then showing as many as possible that could be measured in a single camera image allows the processes to be parallelized.

Parallelization Color Samples Through Color Tiling of the Display

Many display color measurement systems either measure a single point (i.e., the center) or the entire display at a single color. In contrast, the present system captures multiple color samples by a single actuation of the measurement device (i.e., the camera). In one embodiment, the system measures many colors in a chit-based tiling pattern in the camera to speed the process, capture several samples of the same color at potentially different offsets, and normalize their values regardless of where they fall in the pattern so that the measurements are all in the same relative space. One aspect of this process is simply color pattern tiling during the capture process.

What is claimed is:

1. A computer-automated method for color measurement and correction of multiple display devices comprising:
   creating chits by generating a measurement pattern comprising display regions on each display device, wherein each of the chits comprises one of the display regions;
   establishing a correspondence between each of the chits and their location in a measurement camera so that when a particular chit is illuminated, corresponding pixels in the chit are measured in the camera by performing steps including:
   adjusting the effective shutter-speed of the camera based on expected exposure values and the colors to be measured;
   displaying one or more chits having a particular color value;
   measuring, in the camera, pixel values for pixels corresponding to each displayed chit;
   processing the pixel values in the camera for each chit to determine a set of measured color values each corresponding to the color displayed for each pixel in a respective chit;
   normalizing the measured color values based on the shutter speed being used to capture those color values, and
   repeating the color measurement process until all colors to be measured have been displayed.

2. The method of claim 1, wherein the adjusting step includes adjusting the measurement exposure time of the camera based on expected exposure values and the colors to be measured.

3. The method of claim 1, including selecting from the colors to be measured a set that is most likely to lead to camera-observable measurements in the camera by displaying those color values in the displaying step.

4. The method of claim 1, including selecting from the colors to be measured a set that is most likely to lead to observable measurements in the camera, based on camera current settings, by displaying the color values at chit locations that are known to increase the likelihood that, when observed in a corresponding location in the camera, the chit locations will allow observable measurements to be made in the displaying step.

5. The method of claim 1, wherein the color values are displayed more than once and the corresponding color values are determined through statistical analysis.

6. The method of claim 5, wherein the average value over a predetermined number of frames is determined for at least some of the displayed colors.

7. The method of claim 1, wherein the correspondence between chits in each projector and camera is established by:
   displaying each said chit a specific number of times to establish a unique indicia for the chit;
   capturing an image of the displayed chits; and
   counting the number of times that a chit was observed to establish uniquely the displayed chit.

8. The method of claim 1, wherein a particular color is measured over time at the same chit location to establish a temporal normalization factor which is used to modify other measured color values for the corresponding chit based on the time the color values were measured.

9. A computer-automated method for color measurement and correction of multiple display devices comprising:
   creating chits by generating a measurement pattern comprising display regions on each display device, wherein each of the chits comprises one of the display regions;
   establishing a correspondence between each of the chits and their location in a measurement camera so that when a particular chit is illuminated, corresponding pixels in the chit are measured in the camera;
   measuring a color modification factor by displaying at least one color of the same values in each chit and then measuring the resulting energy in the corresponding regions of the camera;
   defining an attenuation factor that is the ratio of each chit's value to the brightest chit measured at that value;
   displaying one or more chits of a particular color;
   measuring the pixel values in the camera that correspond to each chit;
   Modifying those pixel values based on the modification factor computed for the chit in which a measurement was performed;
   processing the pixels in the camera for each chit independently to arrive at a set of color values that correspond to the color values displayed, and
   repeating the color measurement process until all colors have been measured.

10. The method of claim 9, wherein the modification factors of the chits are fit to an attenuation function that defines, for a measured output value, the corresponding modification factor for the measured location; and
   querying the attenuation function for each measurement value and then modifying each of the measurement values based on the result of application of the attenuation function.

11. A computer-automated method for color measurement and correction of multiple display devices comprising:
   computing measurement chits by generating a measurement pattern comprising display regions on each one of the display devices, one at a time; and
   establishing a correspondence between the chits so that when a particular chit is illuminated by a particular color, the pixels in the chit are measured in a camera by performing steps including:
   displaying a specific said chit a specific number of times, based on an assigned identification number;
   assigning the identifier to the sample in the camera frame by counting the number of times the specific chit is observed in the camera,
   displaying a measurement chit having a particular color value;
   capturing an image of the measurement chit using the camera; and
   processing captured pixels in the camera to discover a measured value that corresponds to the color value of the displayed measurement chit.

12. The method of claim 11, wherein each of the color values is displayed more than once and the corresponding measured color values are determined through averaging the measured color values over a predetermined number of frames.

13. The method of claim 11, wherein the measured color values are automatically corrected by replacement with re-measured color values when at least one of the following conditions is determined in the measurement step:
   a color value measurement falls below a particular value as measured in the camera;
   a color value exceeds a particular threshold value as measured in the camera;
   the statistical properties of the color measurement exceed a particular threshold.

14. The method of claim 11, wherein the correspondence between chits in each projector and camera is established by:

displaying each said chit a specific number of times to establish a unique indicia for the chit;
capturing an image of the displayed chits; and
counting the number of times that a chit was observed to establish uniquely the displayed chit.

15. The method of claim 11, wherein the colors to be measured are displayed at multiple chit locations to provide broader spatial sampling of each display.

16. A computer-automated method for color measurement and correction of multiple display devices comprising:
   creating one or more chits by generating a measurement pattern comprising at least one display region on each display device, wherein each of the chits comprises one of the display regions;
   establishing a correspondence between each of the chits and their location in a measurement camera so that when a particular chit is illuminated, corresponding pixels in the chit are measured in the camera by performing steps including:
      displaying one or more chits having a particular color value;
      measuring, in the camera, pixel values for pixels corresponding to each displayed chit;
      processing the pixel values in the camera for each chit to determine a set of measured color values each corresponding to the color displayed for each pixel in a respective chit; and
      repeating the displaying and measuring steps using different color values for the one or more chits until a predetermined number of different colors have been measured;
   wherein the measured color values are automatically corrected by replacement with re-measured color values when at least one of the following conditions is determined in the measurement step:
   a color value measurement falls below a particular value as measured in the camera;
   a color value exceeds a particular threshold value as measured in the camera;
   the statistical properties of the color measurement exceed a particular threshold.

17. A computer-automated method for color measurement and correction of multiple display devices comprising:
   creating one or more chits by generating a measurement pattern comprising at least one display region on each display device, wherein each of the chits comprises one of the display regions;
   establishing a correspondence between each of the chits and their location in a measurement camera so that when a particular chit is illuminated, corresponding pixels in the chit are measured in the camera by performing steps including:
      displaying one or more chits having a particular color value;
      measuring, in the camera, pixel values for pixels corresponding to each displayed chit;
      processing the pixel values in the camera for each chit to determine a set of measured color values each corresponding to the color displayed for each pixel in a respective chit; and
      repeating the displaying and measuring steps using different color values for the one or more chits until a predetermined number of different colors have been measured;
   wherein the correspondence between chits in each projector and camera is established by:
   displaying each said chit a specific number of times to establish a unique indicia for the chit;
   capturing an image of the displayed chits; and
   counting the number of times that a chit was observed to establish uniquely the displayed chit.

* * * * *